US008229968B2

(12) United States Patent
Wang et al.

(10) Patent No.: US 8,229,968 B2
(45) Date of Patent: Jul. 24, 2012

(54) DATA CACHING FOR DISTRIBUTED EXECUTION COMPUTING

(75) Inventors: Taifeng Wang, Beijing (CN); Tie-Yan Liu, Beijing (CN); Minghao Liu, Beijing (CN); Zhi Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 12/055,777

(22) Filed: Mar. 26, 2008

(65) Prior Publication Data

US 2009/0249004 A1 Oct. 1, 2009

(51) Int. Cl.
*G06F 7/00* (2006.01)
*G06F 17/30* (2006.01)
(52) U.S. Cl. .......................... 707/798; 707/748; 709/219
(58) Field of Classification Search .................. 707/748, 707/798
See application file for complete search history.

(56) References Cited

U.S. PATENT DOCUMENTS

| 5,642,501 | A | * | 6/1997 | Doshi et al. ..................... 707/613 |
| 5,701,460 | A | * | 12/1997 | Kaplan et al. ................. 707/748 |
| 6,094,706 | A | | 7/2000 | Factor et al. |
| 6,167,438 | A | | 12/2000 | Yates et al. |
| 6,549,896 | B1 | * | 4/2003 | Candan et al. ........................ 1/1 |
| 6,618,737 | B2 | * | 9/2003 | Aridor et al. ........................... 1/1 |
| 6,711,563 | B1 | * | 3/2004 | Koskas ......................... 707/769 |
| 7,272,607 | B2 | | 9/2007 | Udeshi et al. |
| 7,921,117 | B2 | * | 4/2011 | Saxena .......................... 707/748 |
| 2002/0144101 | A1 | | 10/2002 | Wang et al. |
| 2004/0003055 | A1 | * | 1/2004 | Holland et al. ............... 709/219 |
| 2006/0036598 | A1 | * | 2/2006 | Wu ..................................... 707/5 |
| 2007/0094213 | A1 | | 4/2007 | Lai et al. |
| 2007/0208693 | A1 | * | 9/2007 | Chang et al. ....................... 707/2 |
| 2007/0219754 | A1 | * | 9/2007 | D'Ambrosio ................. 702/188 |
| 2008/0172674 | A1 | * | 7/2008 | Yee et al. ....................... 718/106 |
| 2008/0215416 | A1 | * | 9/2008 | Ismalon .......................... 705/10 |
| 2008/0300851 | A1 | * | 12/2008 | Chakrabarti et al. ........... 703/22 |
| 2009/0164895 | A1 | * | 6/2009 | Baeza-Yates et al. ......... 715/700 |
| 2009/0171731 | A1 | * | 7/2009 | Bobak et al. ...................... 705/8 |
| 2009/0228296 | A1 | * | 9/2009 | Ismalon ............................ 705/1 |

OTHER PUBLICATIONS

Beck et al., "Logistical Computing and Internetworking: Middleware for the Use of Storage in Communication", retrieved on Aug. 22, 2008 at <<http://wotan.liu.edu/docis/lib/sisl/rclis/dbl/parcom/(2002)28%253A12%253C1773%253AMFTUOS%253E/www.serc.iisc.ernet.in%252F~vss%252Fpublications%252Floci-sc2001.pdf>>, 3rd Annual Intl Workshop on Active Middleware Services, 2001, 9 pgs.

(Continued)

*Primary Examiner* — Wilson Lee
*Assistant Examiner* — Jessica N Le
(74) *Attorney, Agent, or Firm* — Lee & Hayes, PLLC

(57) ABSTRACT

Embodiments for caching and accessing Directed Acyclic Graph (DAG) data to and from a computing device of a DAG distributed execution engine during the processing of an iterative algorithm. In accordance with one embodiment, a method includes processing a first subgraph of the plurality of subgraphs from the distributed storage system in the computing device. The first subgraph being processed with associated input values in the computing device to generate first output values in an iteration. The method further includes storing a second subgraph in a cache of the device. The second subgraph being a duplicate of the first subgraph. Moreover, the method also includes processing the second subgraph with the first output values to generate second output values if the device is to process the first subgraph in each of one or more subsequent iterations.

17 Claims, 7 Drawing Sheets

OTHER PUBLICATIONS

Gaysinsky et al, "Strongly Competitive Algorithims for Caching with Pipelined Prefetching", retrieved on Aug. 22, 2008 at <<http://www.cs.technion.ac.il/~itai/publications/prefetching-IPL.pdf>>, Proc 9th Annual European Symoposium on Algorithms, 2001, 11 pgs.

Isard et al., "Dryad: Distributed Data-Parallel Programs from Sequential Building Blocks", retrieved on Aug. 22, 2008 at <<http://research.microsoft.com/users/misard/papers/eurosys2007.pdf>>, European Conf on Computer Systems, 2007, 14 pgs.

Ramanujam et al., "Iteration Space Tiling for Distributed Memory Machines", retrieved on Aug. 22, 2008 at <<http://www.ee.lsu.edu/jxr/papers/bookchap/icase.PS>>, in Languages, Compilers and Environments for Distributed Memory Machines, 1992, 16 pgs.

Yang et al., "Mapping Iterative Task Graphs on Distributed Memory Machines", retrieved on Aug. 22, 2008 at <<http://citeseerx.ist.psu.edu/viewdoc/download;jsessionid=75FF2FBBB4E51D206D06E34D234EEFCE?doi=10.1.1.50.6784&rep=rep1&type=pdf>>, Proc 24th Intl Conf Parallel Processing, Aug. 1995, 8 pgs.

* cited by examiner

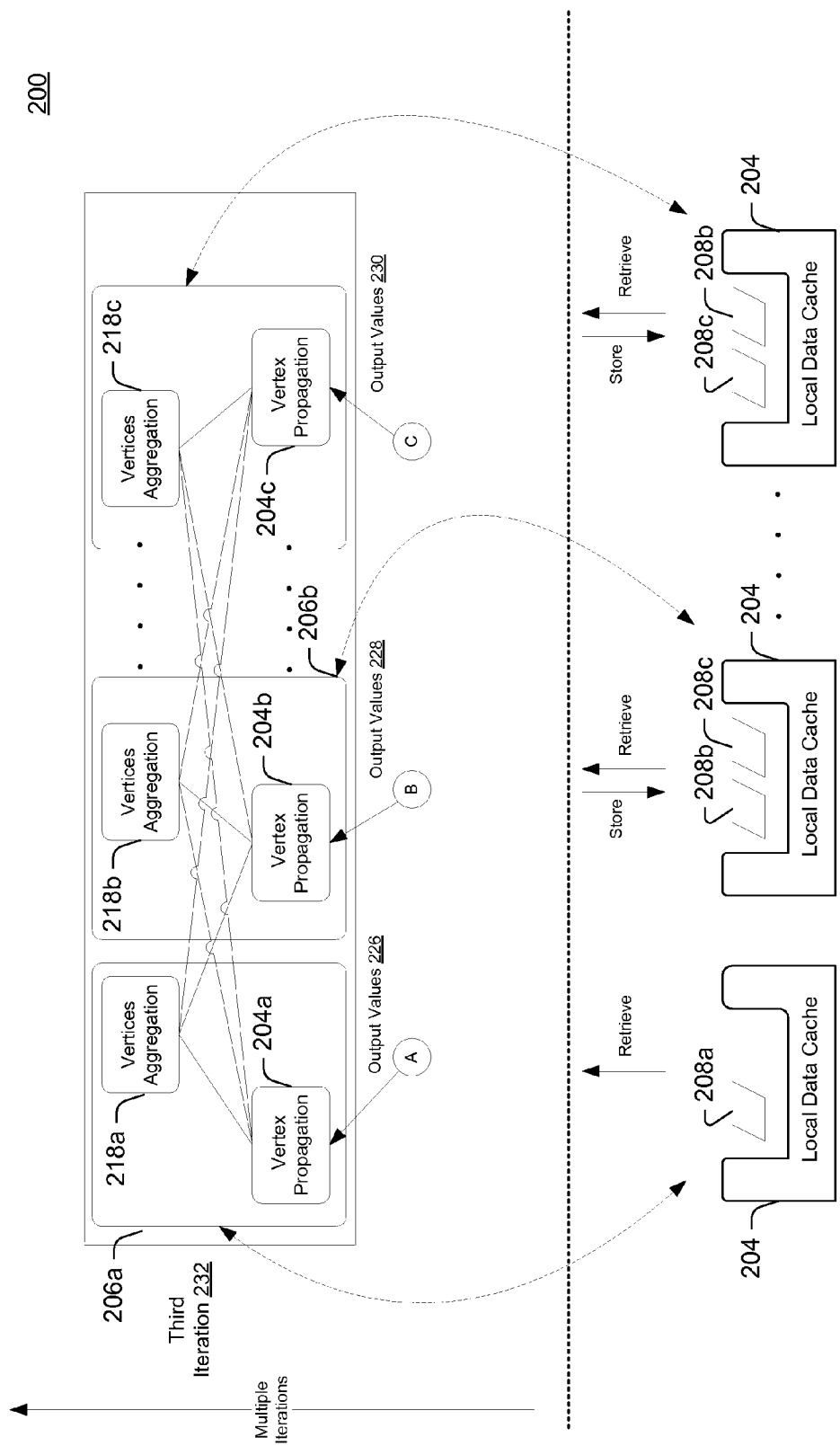

DATA CACHING FOR DISTRIBUTED EXECUTION COMPUTING

BACKGROUND

Distributed computing is the use of networked computing devices to process data. In one implementation, the data processed by a distributed computing scheme may be organized into a data structure known as a Directed Acyclic Graph (DAG). In such a scheme, a "node" of the DAG represents a computational task, and each "edge" of the DAG represent a specific flow of a data stream. Each computational task involves the use of data inputs and disk outputs. In most instances, the distributed computing scheme also involves the use of iterative algorithms to process data. The combination data input/output during each task and the use of iterative processing may result in the transfer of large amounts of DAG data via data "pipelines" at each iterative step of the distributed computing scheme.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for implementing of a memory caching service into a Directed Acyclic Graph (DAG) distributed execution engine. The memory caching service may enhance efficiency by reduce or eliminate the need to transfer DAG data via data "pipelines" at each iterative data processing step of an iterative algorithm that is implemented on the DAG distributed execution engine. In one embodiment, a method includes storing subgraphs of a directed acyclic graph (DAG) in a distributed storage system. The method also includes processing a first subgraph of the plurality of subgraphs from the distributed storage system in a device of the DAG distributed execution engine. The first subgraph being processed with associated input values in the device to generate first output values in a first iteration. Additionally, the method includes storing a second subgraph in a cache of the device. The second subgraph being a duplicate of the first subgraph. The method further includes processing the second subgraph with the first output values to generate a second output values if the device is to process the first subgraph in a second iteration. The second iteration being an iteration that occurs after the first iteration.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 2A and 2B are block diagrams illustrating an exemplary scheme for caching and accessing Directed Acyclic Graph (DAG) data to and from computing devices during the processing of an iterative algorithm on a DAG distributed execution engine, in accordance with at least one embodiment for data caching on a distributed execution engine.

DETAILED DESCRIPTION

This disclosure is directed to embodiments that facilitate the storage and access of Directed Acyclic Graph (DAG) data to and from a cache during the process of the graph data by a DAG distributed execution engine. The embodiments described herein are directed to the caching of previously processed subgraphs of a DAG in the local cache of a computing device during the processing of a particular iteration of an iterative algorithm. Additionally, each of the subgraphs are accessed from the local cache of the computing device and further processed if the computing device is assigned the processing of the same subgraph in one or more subsequent iterations. In this way, embodiments of the present disclosure may eliminate the need to transfer a subgraph, which may encompass large amounts of data, between computing devices for successive iterations of the iterative algorithm. Various examples of storing and accessing the previously processed subgraphs in the cache of a computing device for subsequent processing by the same computing device during the execution of an iterative algorithm are described below with reference to FIGS. 1-5.

Exemplary Schemes

Figure 1:
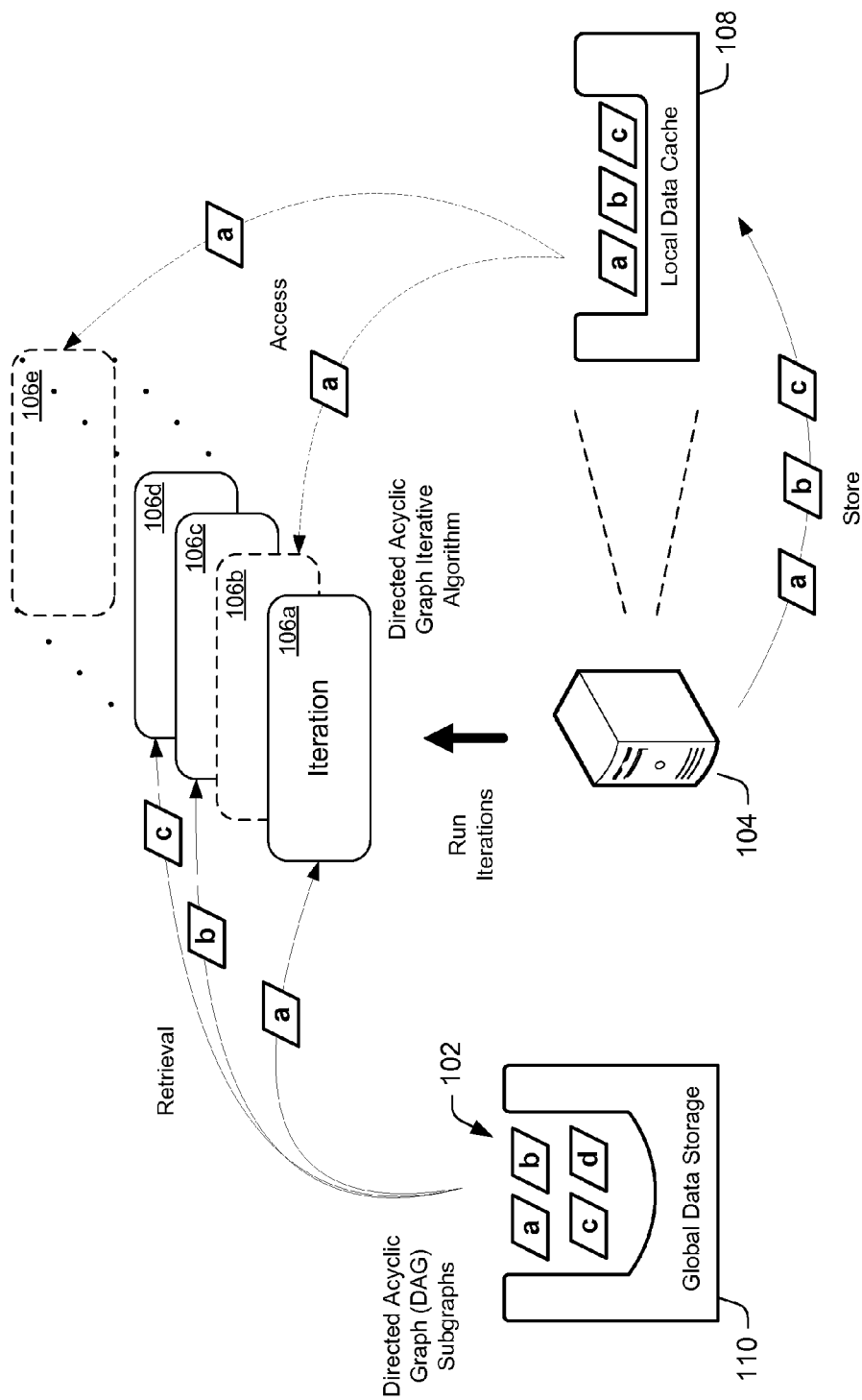
FIG. 1 is a block diagram illustrating caching and accessing Directed Acyclic Graph (DAG) data to and from a computing device during the processing of an iterative algorithm in accordance with at least one embodiment.

FIG. 1 is a block diagram illustrating caching and accessing Directed Acyclic Graph (DAG) data to and from a computing device of a distributed execution engine during the processing of an iterative algorithm in accordance with at least one embodiment. A DAG represents casual flows between a set of observational data and the variables that may operate on the systems. For example, a DAG may be used to represent the web page link information for various web pages. As further described below, the web page link information includes data on the number of links on each web page and the web page linked to by each link. In another example, A DAG may also be used to represent the relationships between the stock prices listed on various stock exchanges around the world. Typically, a DAG includes a number of vertices ("nodes") and a plurality of edges. Each vertex may represent a computation task, and each edge between two vertices may represent the relationship between tasks. A DAG may be processed to produce discrete end results. For example, the processing of a DAG that represents web page link information for various web pages may generate a page ranking for each web page.

The DAG may be divided into discretion portions of data for processing, which are referred to as subgraphs. Exemplary subgraphs 102 are shown in FIG. 1. Moreover, the subgraphs 102 may be processed on a distributed execution engine via an iterative algorithm. In one embodiment, the distributed execution engine is comprised of a plurality of networked computing devices, such as a computing device 104. Each computing device is configured to process a particular subgraph in one iteration of the iteration algorithm.

For example, during a first iteration, such as iteration 106a, a first set of inputs and a subgraph are processed together to generate outputs. In a succeeding iteration, such as iteration 106b, the outputs are used as its input and process with a subgraph to produce additional outputs. In a subsequent iteration, such as iteration 106c, these additional outputs are once again used as inputs and process with another subgraph to generate subsequent outputs. In this way, the iterations of the iterative algorithm may be repeated until the desired final outputs are generated.

As further shown in FIG. 1, the subgraph processed during each iteration may be cached on a local data cache 108. The local cache 108 is included in the computing device 104. For instance, during iteration 106a, the computing device 104 may be assigned by the iteration algorithm to process subgraph 102a. Accordingly, the computing device 104 may retrieve the subgraph 102a from a global data storage 110 and process the subgraph. The computing device 104 may also store the subgraph 102a in the local data cache 108. Subsequently, the computing device 104 may be assigned by the iteration algorithm to execute iteration 106b using the subgraph 102a. Since the subgraph 102a is already stored in the local data cache 108, the computing device 104 may access the subgraph 102a from the cache 108 rather than the global data source 110 to execute the iteration 106b.

Next, the computing device 104 may be assigned by the iterative algorithm to process subgraph 102b during iteration 106c. Accordingly, the computing device 104 may retrieve the subgraph 102a from a global data storage 110 and process the subgraph. The computing device 104 may further store the subgraph 102b in the local data cache 108. During the iteration 106d, the computing device 104 may perform similar retrieval, and processing of subgraph 102c, as well as the storage of subgraph 102c into local data cache 108. In the iteration 106e, the iterative algorithm may be assigned to repeat the processing of subgraph 102a. Thus, the computing device 104 may once again access the stored subgraph 102a from the local data cache 108. It will be appreciated that the iterations 106a-106e are illustrative, and the actual number of iterations may vary. Further, while only the access of subgraph 102a from the local data cache 108 is illustrated in FIG. 1, any subgraph stored in the cache 108 may be accessed for repeated processing in a subsequent iteration.

In essence, the local data cache 108 of the computing device 104 functions to store subgraphs that have been processed in previous iterations of the iterative algorithm. The computing device 104 may further retrieve a stored subgraph in an iteration where the stored subgraph is to be processed. In this way, the need to retrieve previously processed subgraphs from the networked global data storage 110 may be eliminated. As further described below, the use of the local data cache 108 to store previously processed subgraphs confers several benefits.

Figure 2A:
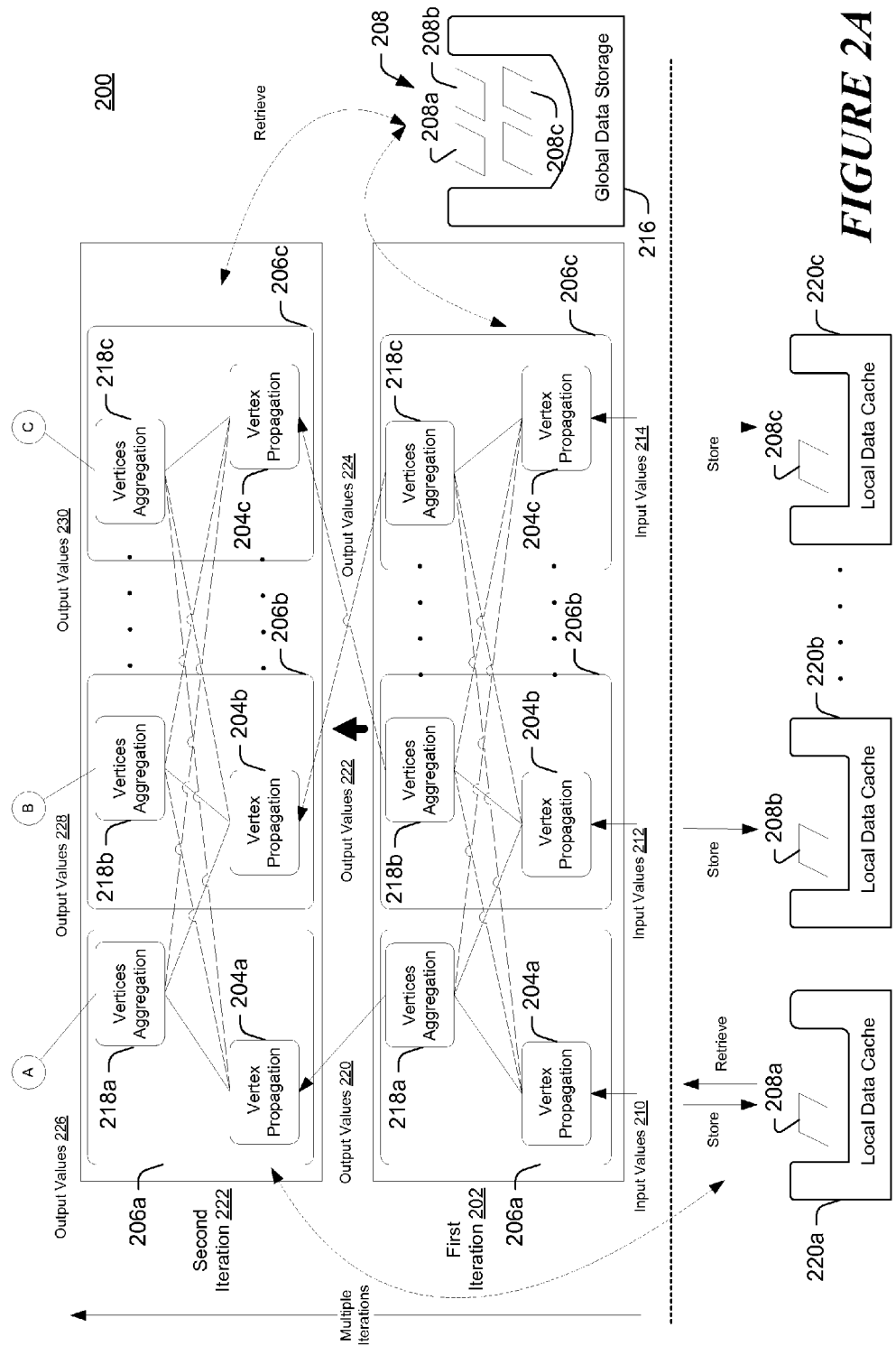

FIGS. 2A and 2B further illustrate an exemplary scheme 200 for caching and accessing Directed Acyclic Graph (DAG) data to and from a computing device. The exemplary cache and access of DAG data may occur during the processing of the DAG by a DAG distributed execution engine. FIGS. 2A and 2B differ from FIG. 1 in that they illustrate exemplary subgraph retrieval, processing, and storage events that occur across multiple computing devices of the distributed computing engine, rather than from the perspective of a single computing device.

As shown in FIG. 2A, a first iteration 202 is implemented by vertex propagation algorithms 204a, 204b, and 204c. Each of the vertex propagation algorithms 204a, 204b, and 204c may be carried out by a corresponding computing device that make up the DAG distributed execution engine. For example, the DAG distributed execution engine may include computing devices 206a, 206b, and 206c. Accordingly, the vertex propagation algorithm 204a may be executed by the computing device 206a, and the vertex propagation algorithm 204b may be executed by the computing device 206b. Similarly, the vertex propagation algorithm 204c may be carried out by the computing device 206c.

Additionally, each of the vertex propagation algorithms 204a, 204b, and 204c is assigned to process a certain partition, or one of the subgraphs 208, of a DAG. The partition of the DAG into subgraphs 208 may facilitate processing. For example, the distributed execution engine may be used to process a page rank algorithm that calculates web page rankings. Typically, a page rank algorithm is designed to assign weight to each of a plurality of web pages, with the purpose of ranking the web pages according to the relative importance of each web page. In such an instance, the DAG may represent a plurality of web pages, and include a plurality of data records that indicate the number of page links present in each web page. An exemplary DAG file with exemplary data records in sparse matrix mode is shown in Table I. The exemplary data records are designed to represent the relationship between pages, as well as the number of page links in each webpage.

TABLE I

Data Records in an Exemplary DAG File

| Source Page | Destination Page Set |
|---|---|
| 1 | 2, 3, 100, 10,000 . . . |
| 2 | 3, 100, 200, 10000, 10,001 . . . |
| 3 | 100, 1,007, 20,008 . . . |
| 4 | 1, 2, 3 . . . |
| . . . | . . . |
| 100 | 3, 4, 10,000 . . . |
| . . . | . . . |
| 200 | 100, 200, 20000, 30,020 . . . |

As shown, each line of Table I represents a record in the DAG graph file. Each number in the table represents an assigned index number of a web page. For example, as shown in the second row of the table, a web page designated with the index number "1" (Source Page) has links to web pages assigned with index numbers "2", "3", "100", and "10,000", respectively (Destination Page Set). Likewise, a webpage designated with the index number "2" (Source Page) has links to web pages assigned with index numbers "3", "100", "200", respectively (Destination Page Set), and so forth. Moreover, the plurality of indexed data records may be partitioned according the ranges of the indices. For example, the subgraph 208a may include data records having indices between 1 and 99, while the subgraph 208b may include data records having indices between 100 and 199, and so on.

In various embodiments, each of the vertex propagation algorithms 204a, 204b, and 204c may be implemented using a one of the subgraphs 208 and a set of corresponding input values. For example, vertex propagation algorithm 204a may be implemented using subgraph 208a and the set of input values 210. Likewise, vertex propagation algorithm 204b may be implemented using subgraph 208b and the set of input values 212, and vertex propagation algorithm 204c may be implemented using subgraph 208c and the set of input values 214. Accordingly, each of the computing devices 206a, 206b, and 206c may access a subgraph that correspond to each set of input values from a global data storage 216. It will be appreciated that when the first iteration 202 is an initial iteration executed by the DAG distributed execution engine, and the iterative algorithm includes an Eigenvalue algorithm, the input values 210, 212, and 214 may be arbitrarily assigned.

During the implementation of the vertex propagation algorithms 204a, 204a, and 204c, each of the algorithms may generate a set of temporary values. For instance, in the page rank example described above, a set of temporary values may include the rank values of the web pages in the subgraph. In other words, each web page in the subgraph is assigned a temporary rank value based on the number of links in the page. Subsequently, the sets of temporary values from the vertex propagation algorithms, such as vertex propagation algorithms 204a, 204b, and 204c are further consolidated at each of the computing devices 206a, 206b, and 206c. These consolidations may be carried out at each of the computing devices using vertices aggregation algorithms 218a, 218b, and 218c, respectively. As shown in FIG. 2A, the vertices aggregation algorithm 218a, 218b, and 218c enable the calculation of output values 220, 222, and 224.

Referring again to the instance where in the distributed execution engine is used to calculate web page rankings, a vertices aggregative algorithm, such as vertices aggregation algorithm 218, may consolidate the rank values for a particular webpage as calculated by the vertex propagation algorithms on each computing device. For example, as illustrated in Table I, if records 1-99 are partitioned into the subgraph 208a, and records 100-199 are partitioned into the subgraph 208b, rank values for web page "3" may be obtained from both vertex propagation algorithms 204a and 204b, as web page "3" is "present" in the destination sets of subgraphs 208a and 208b. Accordingly, the aggregation algorithm may consolidate the rank values for web page "3" from propagation algorithms 204a and 204b to derive a combined rank value. The aggregation algorithm on each computing device may perform such a consolidation of rank values for each webpage that is "present" in a plurality of subgraphs. Therefore, each of the vertices aggregation algorithms 218a, 218b, and 218c may provide sets of output values 220, 222, and 224, respectively in this manner. Once the vertices aggregation algorithms have provided the output values, the first iteration 202 may terminate.

Prior to the execution of a second iteration 222 by each of the computing devices, a data manager may store the subgraph processed by each computing device in a respective cache of the computing device. Continuing with the example described above, since vertex propagation algorithm 204a is implemented using the subgraph 208a, the subgraph 208a may be stored in a cache 220a of the computing device 206a. Moreover, since vertex propagation algorithms 204b and 204c are respectively implemented using the subgraph 208b and 208c, the subgraph 208b may be stored in a cache 220b of the computing device 206b. Similarly, the subgraph 208c may be stored in a cache 220c of the computing device 206c. According to various embodiments, the transfer of the subgraphs into the respective caches of the computing devices may occur at any point prior to the execution of the second iteration 222. For example, the transfers may occur before, after, and/or simultaneous with the execution of one or more of the vertex propagation algorithm and the vertices aggregation algorithm on a computing device.

Subsequently, the DAG distributed execution engine may execute a second iteration 222. Like the first iteration 202, the second iteration 222 is performed using the same computing devices of the DAG distributed execution engine. Once again, each computing device performs its processing using a set of input values and an associated subgraph. Thus, the second iteration 222 may be executed using the output values 220, 222, and 224 as input values for the vertex propagation algorithms 204a, 204b, and 204c, respectively.

During the second iteration 222, the DAG distributed execution engine may use the output values 220 from the computing device 206a as input values to re-execute the vertex propagation algorithm 204a on the computing device 206a. Accordingly, since the output values 220 are associated with subgraph 208a, the computing device 206a may access the stored subgraph 208a from the data cache 220a of the computing device 220a. The access of the subgraph 208a from the data cache 220a may advantageously eliminate a second download of subgraph 208a from the global data storage 216. Thus, the use of data transfer bandwidth may be reduced. Additionally, since the data cache 220a is local to the computing device 206a, computing device 206a may be ready to execute the second iteration 222 without being hindered by data transfer lag.

However, for the sake of performance stability, the computing devices included in the DAG distributed execution engine may be called upon to propagate and aggregate different vertices ("nodes") in the second iteration 222. In other words, the DAG distributed execution engine may switch the subgraphs and associated values process by each computing device. For example, rather than remaining with computing device 206b, the output values 222, which is derived from the subgraph 208b and input values 212, may be reassigned to the computing device 206c for further processing. Likewise, the output values 224, which derived from the subgraph 208c and input values 214, may be reassigned to the computing device 206b for processing. As a result, the computing device 206b is reassigned to process the output values 224 with subgraph 208c during the second iteration 222. The computing device 206c is reassigned to process the output values 222 with subgraph 208b during the second iteration 222.

As shown in FIG. 2A, following the execution of the first iteration 202, the subgraph 208b may be stored in the local cache 220b of the computing device 206b. However, the local cache 220b does not contain the subgraph 208c. Thus, in order to perform the second iteration 222, the computing device 206a may access the global data storage 216 to retrieve the subgraph 208c. A similar situation may also exist for the computing device 206c. Since the computing device 206c does not contain the subgraph 206c, the computing device 206 may also access the global data storage 216 to retrieve the subgraph 206b so that the second iteration 222 may be performed.

The second iteration 222 is performed in a similar manner as the first iteration 202. First, the vertex propagation algorithms 204a, 204b, and 204c of the respective computing devices 206a, 206b, and 206c may be implemented on the corresponding input values and subgraphs to generate temporary values. Subsequently, the vertex aggregation algorithms 218a, 218b, and 218c may be implemented on the sets of temporary values to generate the sets of final output values 226, 228 and 230. For example, the sets of output values 226, 228, and 230 may be web page rank scores. Once the vertices aggregation algorithms have provided the output values, the second iteration 222 terminates.

As shown in FIG. 2B, prior to the execution of a third iteration 232 by each of the computing devices, a data manager may store the subgraph processed by each computing device in the respective local cache of the computing device. However, this storage process only occurs for each cache provided that the processed subgraph is not previously stored in the cache. For example, since the subgraph 208a is already stored in the local cache 220a, there is no need for the computing device 206a to repeat the storage of subgraph 208a. However, the subgraph 208c, as processed by the vertex propagation algorithms 204b in the second iteration 222, was not previously stored in the local cache 220b of the computing device 206b. As a result, the data manager may cause the computing device 206b to store the subgraph 208c in the local cache 220b. Likewise, the subgraph 208c, as processed by vertex propagation algorithms 204c in the second iteration 222, was not previously stored in the local cache 220c of the computing device 206c. Thus, the data manager may cause the computing device 206c to store the subgraph 208b in the local cache 220c.

For the third iteration 232, the DAG distributed execution engine may provide that each of the computing devices 206a, 206b, and 206c process the same subgraphs and associated values as processed in the second iteration 222. Accordingly, the computing device 206a may access the stored subgraph 208a on the data cache 220a. Likewise, the computing devices 206b may access the stored subgraph 208c on the data cache 220b, and the computing device 206c may access the stored subgraph 208b on the data cache 220c. As described above, the access of the subgraphs on the local caches on the computing devices may reduce data transfer lag. Once the subgraphs are accessible, the third iteration 232 may be performed on each computing device using one of the set of output values 226, 228, and 230 as a set of input values. The third iteration 232 may be implemented on each computing device using one of the respective vertex propagation algorithm 204a, 206b, and 206c, and the respective vertices aggregative algorithms 218a, 218b, and 218c. In this way, additional iterations of the iteration algorithm may be performed, with each computing device storing a newly encountered subgraph in its data cache for possible processing in another iteration. It will be appreciated that an iteration during which a computing device is assigned to access a subgraph that it has processed previously may or may not occur consecutively after the iteration during which the subgraph is stored. Indeed, such an iteration may occur any number of iterations after the iteration during which the subgraph is stored. Moreover, the subgraphs 208 are not modified in each iteration. Thus, in one embodiment, the subgraphs 208 may be read-only data files.

While exemplary scheme 200 is illustrated with respect to the computing devices 206a, 206b, and 206c, a limited number of subgraphs, and a limited number of iterations, a DAG distributed execution engine may include any number of computing devices. In turn, DAG data for the distributed execution engine may be partitioned into any number of subgraphs, and any number of iterations may be executed to obtain the desired final output values. For example, the calculation of web page rankings may involve a larger DAG that includes linkage data for millions of web pages. Accordingly, each subgraph may contain many gigabytes (GB) of data. Moreover, the DAG may be processed by tens or hundreds of computing devices for hundreds of iterations.

Given this potential large scale, the use of the global data storage 216 and the data caches, such as the data cache 220a, to store subgraphs may provide significant advantage over the handling of subgraphs by a conventional DAG distributed execution engine. In a conventional DAG distributed execution engine, subgraphs are generally transferred from vertex to vertex between iterations via data "pipelines". In other words, in the scenario where the processing of the sets of output values 222 and 224 are switched between the computing devices 206b and 206c, the computing device 206b, as part of a conventional DAG distributed execution engine, needs transfer the subgraph 208b along with the output values 222 to the computing device 206c. Similarly, the computing device 206c needs to transfer the subgraph 208c along with the output values 224 to the computing device 206b. These transferred are generally accomplished via a network, such as an Internet Protocol (IP)-based network.

Thus, in an implementation involving a large number of computing devices and a significant number of iterations, a conventional DAG distributed execution engine may spend a considerable proportion of computing time transferring data between computing devices. The exemplary scheme 200 may serve to decrease the need for data transfer between computing devices, thereby increasing the efficiency of a DAG distributed execution engine that process an iterative algorithm.

Figure 3:
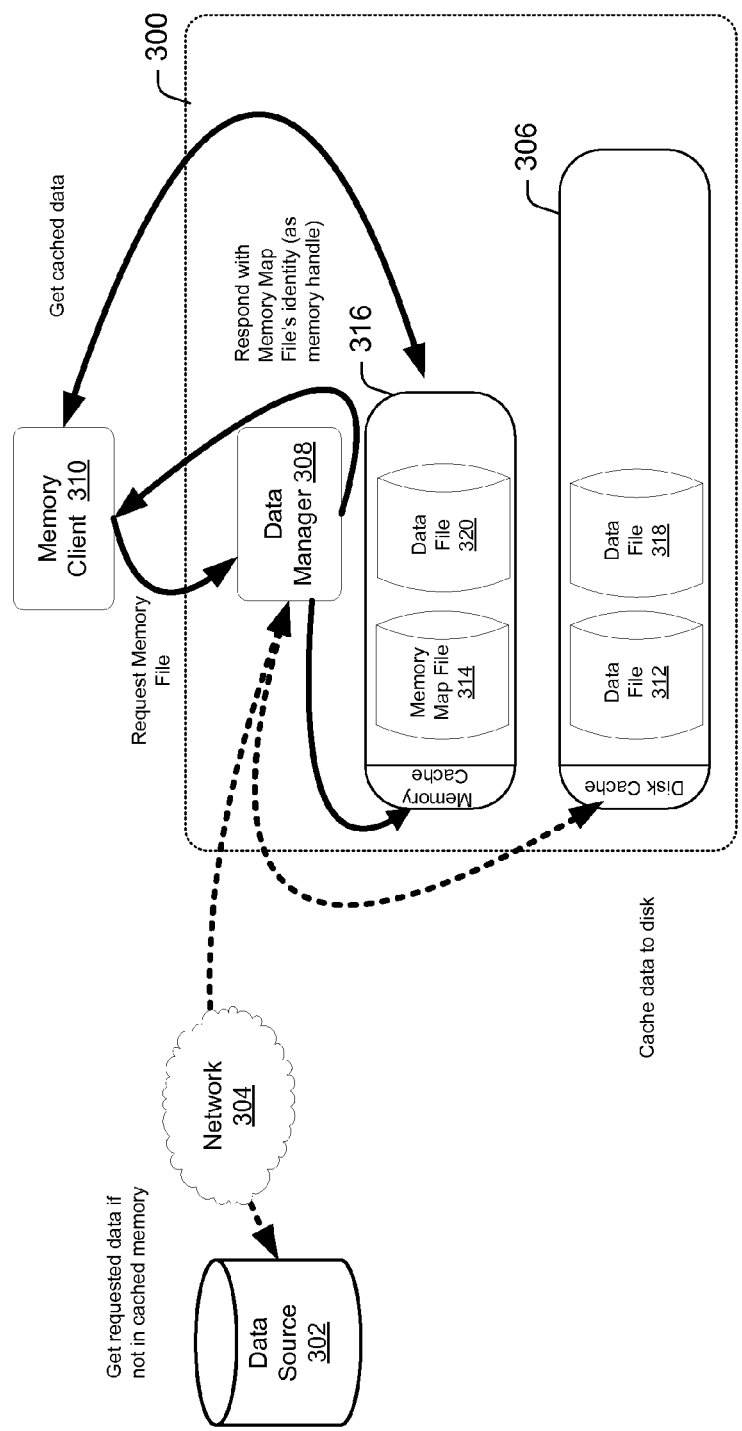
FIG. 3 is a block diagram illustrating selected components of an exemplary data caching system on the computing device that is configured to store and access previously processed Directed Acyclic Graph (DAG) data from a cache on the computing device, in accordance with various embodiments for data caching on a distributed execution engine.

FIG. 3 is a block diagram illustrating the data access operations of an exemplary data caching system 300 on a computing device, in accordance with various embodiments. The data caching system 300 is configured to store and access data to and from multiple sources. These sources may include a data source 302 that is accessible via a network 304, as well as at least one cache that reside the computing device ("local cache"). The local cache may include a disk cache 306 and/or a memory cache 306. In one embodiment, the data source 302 may be the global data storage 216 described in FIG. 2. The network 304 may include at least one of a wide-area network (WAN), a local area network (LAN), and the like.

During operation, an exemplary data manager 308 may receive a data request from a memory client 310. For example, the memory client 310 may be a vertex aggregation algorithm, such as the vertex aggregation algorithm 204a (FIGS. 2A and 2B). Moreover, the data may be a subgraph, such as one of the subgraphs 208 (FIG. 2A). Accordingly, the data manager 308 may obtain the requested data from a data source 303 via the network 304 if the requested data is not in a local cache.

Alternatively, if the requested data is present in a local cache, the data manager 308 may access the data from a local cache. For instance, one or more data files, such as a data file 312, may be located in the disk cache 306. The data file 312 may include a subgraph. A memory map file 314 is associated with the data file 312. The memory map file 314 may be stored in a memory cache 316, which may be located in a random access memory (RAM) of the computing device. The memory map file 314 may act as a "buffer" that stores at least a portion of the data in the data file 312. Moreover, the memory map file 314 may be a virtual memory space that is readily accessible by the memory client 310. Accordingly, by using a memory map file 314, the data manager 308 may enable the memory client 310 to read and/or write data from the data file 312 without the need to retrieve and/or duplicate the entire data file 312. Thus, the speed and performance of file access may be enhanced. In one embodiment, the memory client 310 may pass a memory file request, such as for the data file 312, to a data manager 308. In turn, the data manager 308 may locate the memory map file 314 in the memory cache 316 and respond with the identity of the memory mapped file. The memory client 310, which may be a vertex aggregation algorithm, then accesses at least a portion of the data file 312 via the memory map file 314. Nevertheless, a subgraph may also be stored as a data file 318 in the disk cache 306 so that the data file 318 is accessible by the memory client 310 via read and/or write operations. In another embodiment, a data file 320 that includes a subgraph, and which is directly accessible by the memory client 310, may be stored in the memory cache 316. It will be appreciated that the disk cache 306 and the memory cache 316 may be configured to store a plurality of data files that performs the same functions as each of the data file 312, memory map file 314, data file 318, and data file 320.

Figure 4:
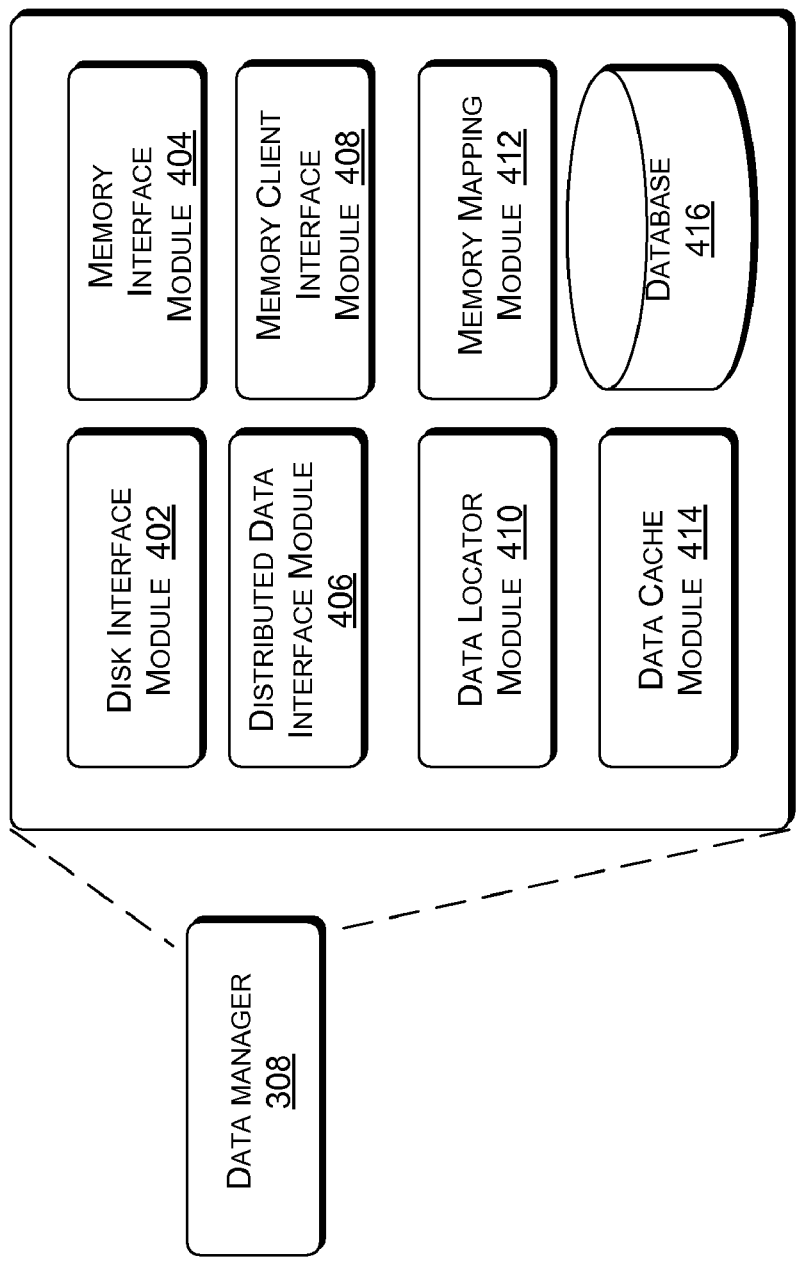
FIG. 4 is a block diagram illustrating selected components of an exemplary data manager that is configured to store and access previously processed Directed Acyclic Graph (DAG) data from a cache on the computing device, in accordance with various embodiments for data caching on a distributed execution engine.

FIG. 4 is a block diagram illustrating selected components of the exemplary data manager 208. The data manager 308 is configured to store and access previously processed Directed Acyclic Graph (DAG) subgraph from a cache on a computing device, in accordance with various embodiments. The exemplary data manager 308 may include computer program instructions that are executed by a computing device, such as the computing device 206a described in FIG. 2. Program instructions, or modules, may include routines, programs, objects, components, and data structures that perform particular tasks or implement particular abstract data types. The selected components of the data manager 308 may include, but are not limited to, a disk interface module 402, a memory interface module 404, a distributed data interface module 406, a memory client interface module 408, a data locator module 410, a memory mapping module 412, and a data cache module 414. The data manager 308 may also include a database 416.

The disk interface module 402 is configured to enable the data manager 308 to interact with a disk cache, such as the disk cache 306. Likewise, the memory interface module 404 is employed to enable the data manager 308 to interact with a memory cache, such as the memory cache 306. The distributed data interface module 406 is configured to enable the data manager 308 to interact with a distributed execution data source that is external to the computing device, such as the data source 302.

The memory client interface module 408 is configured to interface with an application to store and access data files to a cache on the computing device. For example, the memory client interface module 408 may enable requests for subgraphs to be received from a memory client, such as the memory client 310 (FIG. 3). Moreover, once the data manager 308 locates a particular subgraph, the memory client interface module 408 may enables the memory client to access the particular subgraph. For example, the data manager 308 my use the memory client interface module 408 to pass the identity of the particular subgraph as a memory handle to the memory client 310.

The data locator module 410 is configured to determine the location of data that is requested by the memory client. In one embodiment, once the data manager 308 receives a request for subgraph, the data locator module 410 may ascertain whether the subgraph is located one of the disk cache 306 or the memory cache 316. For example, the data manager 308 may receive a subgraph identifier for a requested subgraph. The data locator module 410 may compare the identity of the requested subgraph to the identities of the subgraphs stored in the database 416 to determine whether the subgraph is located in one of the caches 306 and 316.

The memory mapping module 412 is configured to activate a memory mapping function of the computing device to create a memory map file for a data file. For example, once a subgraph is stored in a disk cache 306, the data mapping module 402 may cause a memory map file, such as memory map file 314, to be created.

The data cache module 414 is configured to store data files, such as subgraphs, into one of a disk cache 306 and the memory cache 316 of the computing device. In one embodiment, when a memory client 310 (vertex propagation algorithm), makes a request for a subgraph for processing, the data cache module 414 may activate the data locator module 410 to compare the identity of the subgraph to the subgraphs stored in one of the caches 306 and 316. If the requested subgraph is not located in one of the caches 306 and 316, the data cache module 414 may retrieve the requested subgraph from a global data source, such as the data source 302. Additionally, the data cache module 414 may store the graph in one of the caches 306 or 316. Hence, when a subgraph is stored in one of the caches 306 and 316, the data cache module 414 may update the database 416 with the identity and location of the subgraph.

Furthermore, since memory input/output (I/O) is generally faster than disk I/O, the data cache module 414 may include one or more algorithm that ensures the optimal use of the memory cache 316 and the disk cache 306. For example, the data cache module 414 may include an algorithm that tracks the frequency at which each of a plurality subgraphs stored in the computing device is requested by a vertex aggregation algorithm. Accordingly, one or more subgraphs that meet a first threshold of access frequency may be stored in the memory cache 316 (FIG. 3). One or more subgraphs that meet a second threshold of access frequency may be stored in a disk cache 306 (FIG. 3). However, a memory map file, such as memory map file 314, may be created for each subgraph so that the vertex aggregation algorithm may process a particular subgraph in this category without the need to retrieve and/or duplicate the subgraph. Likewise, in an additional embodiment, one or more subgraphs that meet a third threshold of access frequency may be stored in a disk cache 306 without the creation of corresponding memory map files. Instead, the vertex aggregation algorithm may access each subgraph in this category by performing a read operation from the disk cache 306. In one embodiment, the first threshold access frequency is greater than the second frequency threshold. In turn, the second frequency threshold is greater than the third frequency threshold.

Accordingly, the data cache module 414 may also keep track of the frequency that each subgraph is requested in the database 416. It will be appreciated that the frequency thresholds for the operation of the data cache module 414 may be established in a variety of ways. For instance, the frequency thresholds may be established based on a ratio between the times that a particular subgraph is processed and of total number subgraph processing iterations. To illustrate, a particular subgraph may be deemed to have meet a particular frequency threshold if 10 iterations of the iteration algorithm are performed by the computing device, and the particular subgraph was requested in 8 of those iterations. In another instance, a frequency threshold may simply a predetermined number of times that a subgraph is processed. For example, a frequency threshold may be established so that a subgraph is moved from the disk cache 306 to the memory cache 316 as long as it has been requested a predetermined number of times. Nevertheless, it will be appreciated the frequency thresholds may be established using one or more of variety of criteria, as long as these criteria serve to correlate the speed of the I/O method with the frequency of subgraph request, and serve to place some of the stored subgraphs to the disk cache 306 and other stored subgraphs to the memory cache 316. The data cache module 414 may also keep track of information regarding particular type of cache (e.g., disk, memory), as well as whether a memory map is created, for each stored subgraph.

Furthermore, the data cache module 414 may be provided with the ability to shuffle the subgraphs from between the disk cache 306 and the memory cache 316. In other words, the data cache module 414 may move a subgraph from the disk cache 306 to the memory caches 316, and vice versa. In addition, the disk cache module 414 may also control the memory mapping module 412 to ensure that the appropriate memory mapping files are created and retired, as well possess the ability to purge the subgraphs from the caches 306 and 316 following the termination of an iterative algorithm.

Exemplary Process

Figure 5:
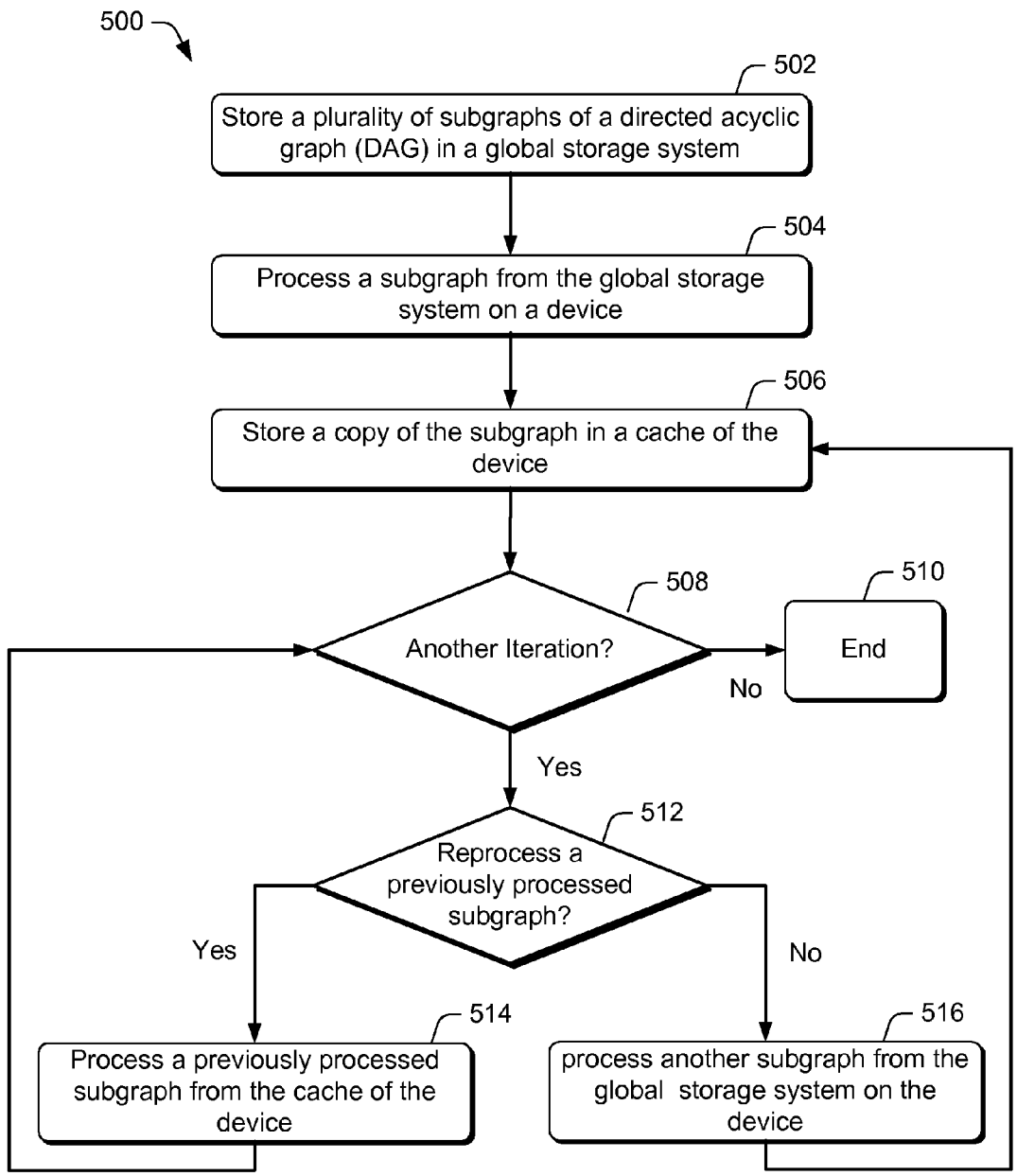
FIG. 5 is a flow diagram illustrating an exemplary process for storing and accessing previously process Directed Acyclic Graph (DAG) data from a cache on the computing device, in accordance with various embodiments for data caching on a distributed execution engine.

FIG. 5 illustrates an exemplary process for caching subgraphs during the executing of a DAG iterative algorithm by a distributed execution engine. The exemplary process in FIG. 5 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the exemplary disk caching system of FIG. 3, although it may be implemented in other system architectures.

At block 502, a plurality of subgraphs of directed acyclic graph (DAG) are stored in a global storage system, such as the global storage system 216 (FIG. 2A). The global storage system may be a distributed data storage system that is configured to interface with the exemplary disk caching system illustrated in FIG. 3. The subgraphs are partitioned portions of the DAG. For example, a DAG may be divided into hundreds or thousands of subgraphs. At block 504, a computing device may process a subgraph, such as one of the subgraphs 208 (FIG. 2A) that is stored on the global storage system. The computing device is a component of a DAG distributed execution engine that may include a plurality of computing devices.

In various embodiments, a vertex propagation algorithm of an iterative algorithm running on the computing device may request a subgraph for processing. In one embodiment, the iterative algorithm may be a web page ranking program. The computing device may use the data manager 308 to access the subgraph from the global storage system via a network, such as the network 304 (FIG. 3). The retrieved subgraph is processed the vertex propagation algorithm of the computing device.

At block 506, a copy of the processed subgraph is stored in a cache of the computing device. For example, the cache may include one of the disk cache 306 and the memory cache 316 (FIG. 3). As described, the memory cache 316 may provide faster access than the disk cache 306. At decision block 508, the iterative algorithm may make a determination as to whether another iteration of the iterative algorithm is to be performed. The iteration algorithm may call for the performance of iterations as long as the desired outputs have not been obtained. For example, if the iteration algorithm is configured to calculate web page ranking for a plurality of web pages based on the links in each page, the iteration algorithm may continue to perform iterations until final rankings for each web page are obtained. The performance of an additional iteration includes additional processing of a subgraph by the vertex propagation algorithm on the computing device.

If the iterative algorithm determines that another iteration of the iterative algorithm need not be performed, the process 500 may proceed to block 510. At block 510, process 500 may be terminated and the final results of the iterative algorithm outputted. However, if it is determined that another iteration of the iterative algorithm is to be performed ("yes" at decision block 508), the process 500 may proceed to decision block 512. At decision block 512, the computing device may make a determination as to whether the subgraph to be process in this iteration has been previously processed by the computing device. In other words, the computing device may ascertain whether the subgraph is stored in a local cache, such as one of the disk cache 306 and memory cache 316, of the device.

If the computing device determines that the subgraph to be processed in the subsequent iteration is stored in the local cache of the computing device ("yes" at the decision block 512), the process 500 may proceed to block 514. At block 514, the computing device may enable the vertex propagation algorithm to access the subgraph from the local cache. In various instances, the vertex propagation algorithm may access the stored subgraph via an I/O operation, a memory map file, or the like. Accordingly, the vertex propagation algorithm may carry out another processing of the stored subgraph. Once the processing of the stored subgraph is completed at block 514, the process 500 may loop back to decision block 508, where the iteration algorithm may determine if an additional iteration is to be implemented.

However, if the computing device determines that the subgraph to be processed in the subsequent iteration is not stored in the local cache of the computing device ("no" at the decision block 512), the process 500 may proceed to block 516. At block 516, the computing device may enable the vertex propagation algorithm to retrieve the subgraph to be processed from the global storage system 216 (FIG. 2A). Once the subgraph is retrieved, it is processed by the vertex propagation algorithm to implement the iteration. With the processing of the subgraph at block 516, the process 500 may loop back to block 506, where a copy of the subgraph is stored in the local cache of the computing device. The process 500 may then proceed further from block 506 until all the iterations of the iteration algorithm are complete.

Exemplary Computing Environment

Figure 6:
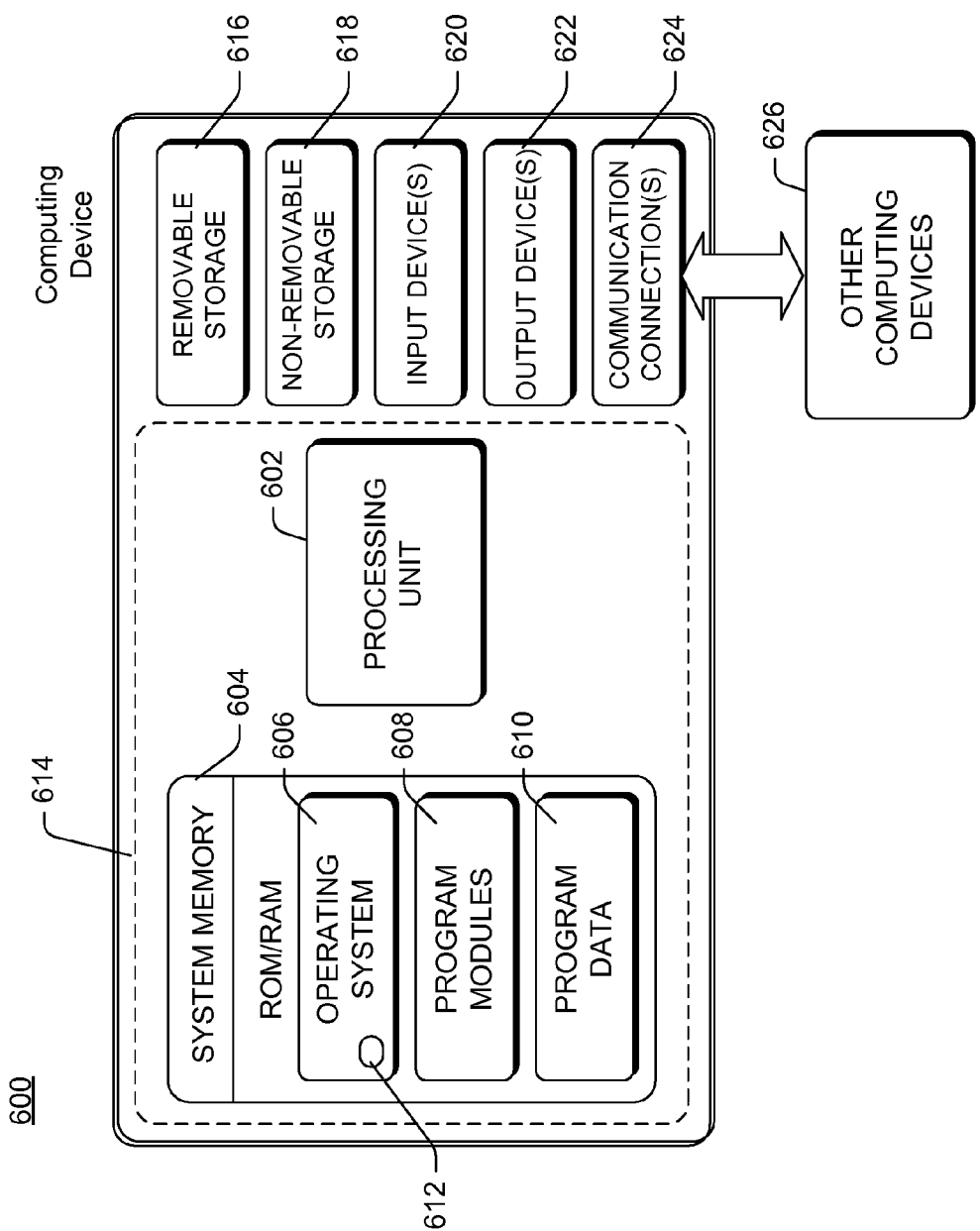
FIG. 6 is a block diagram illustrating a representative computing device. The representative computing device may be implemented as a computing device of the Directed Acyclic Graph (DAG) distributed execution engine shown in FIGS. 1A and 1B.

FIG. 6 illustrates a representative computing device 600 that may be as components of a Directed Acyclic Graph (DAG) distributed execution engine. For example, the representative computing device 600 may be implemented to process subgraphs of a DAG graph, as well as cache the subgraphs during the execution of an iterative algorithm by the DAG distributed execution engine. However, it will readily appreciate that the various embodiments of the selective networked resource techniques and mechanisms may be implemented in other computing devices, systems, and environments. The computing device 600 shown in FIG. 6 is only one example of a computing device and is not intended to suggest any limitation as to the scope of use or functionality of the computer and network architectures. Neither should the computing device 600 be interpreted as having any dependency or requirement relating to any one or combination of components illustrated in the example computing device.

In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 606, one or more program modules 608, and may include program data 610. The operating system 606 include a component-based framework 612 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 600 is of a very basic configuration demarcated by a dashed line 614. Again, a terminal may have fewer components but will interact with a computing device that may have such a basic configuration.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 616 and non-removable storage 618. Computer storage media may include volatile and nonvolatile, removable and non-removable media implemented in any method or technology for storage of information, such as computer readable instructions, data structures, program modules, or other data. System memory 604, removable storage 616 and non-removable storage 618 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 620 such as keyboard, mouse, pen, voice input device, touch input device, etc. Output device(s) 622 such as a display, speakers, printer, etc. may also be included. These devices are well know in the art and are not discussed at length here.

Computing device 600 may also contain communication connections 624 that allow the device to communicate with other computing devices 626, such as over a network. These networks may include wired networks as well as wireless networks. Communication connections 624 are one example of communication media. Communication media may typically be embodied by computer readable instructions, data structures, program modules, etc.

It is appreciated that the illustrated computing device 600 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The caching of previously processed subgraphs by the computing devices of a DAG distributed execution engine may reduce the redundant retrieval and transfer of data for each iteration of an iterative algorithm. Thus, embodiments in accordance with this disclosure may serve to enhance the speed and efficiency of iterative algorithms executed by a DAG distributed execution engine.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A method, comprising:
   storing a plurality of subgraphs of a directed acyclic graph (DAG) in a remote global data storage of a distributed storage system;
   processing multiple subgraphs of the plurality of subgraphs in multiple computing devices of a DAG distributed execution engine, each of the multiple computing devices produces a vertex based on a corresponding subgraph and corresponding input values;
   processing a first subgraph of the plurality of subgraphs from the remote global data storage with associated input values in a computing device of the DAG distributed execution engine in a first iteration by at least producing a vertex using the first subgraph and the associated input values, and aggregating the vertex with vertices produced by the multiple computing devices to generate first output values;
   storing a second subgraph that is a copy of the first subgraph into a local cache of the computing device via a network that connects the local cache to the remote global data storage; and
   processing the second subgraph with the first output values to generate a second output values in response to determining that the computing device is to process the first subgraph in a second iteration,
   wherein the DAG represents a sparse matrix of linkage information between web pages, each of the associated input values represents a rank value of a source web page to associated destination web pages, and each output value represents a rank value of the source web page to other source web pages.

2. The method of claim 1, further comprising processing a third subgraph stored in the remote global data storage of the distributed storage system with the second output values to generate second output values in response to determining that the computing device is to process the third subgraph in the second iteration.

3. The method of claim 1, wherein the second iteration occurs consecutively or non-consecutively after the first iteration.

4. The method of claim 1, wherein the storing the second subgraph into the local cache includes storing the second subgraph into at least one of a memory cache or a disk cache of the computing device.

5. The method of claim 1, wherein storing the second subgraph into the local cache includes creating a memory map file for the second subgraph.

6. The method of claim 5, wherein processing the second subgraph includes accessing the second subgraph using the memory map file.

7. The method of claim 1, wherein the plurality of subgraphs are read-only data files.

8. The method of claim 1, wherein the associated input values are initial input values or output values from another iteration.

9. A computer readable memory having computer-executable instructions that, when executed, perform acts comprising:

storing a plurality of subgraphs of a directed acyclic graph (DAG) in a remote global data storage of a distributed storage system;

processing multiple subgraphs of the plurality of subgraphs in multiple computing devices of a DAG distributed execution engine, each of the multiple computing devices producing a vertex based on a corresponding subgraph and corresponding input values;

processing a first subgraph of the plurality of subgraphs from the remote global data storage with associated input values in a computing device of the DAG distributed execution engine in an iteration by at least producing a vertex using the first subgraph and the associated input values, and aggregating the vertex with vertices produced by the multiple computing devices to generate first output values;

storing a second subgraph that is a copy of the first subgraph into a local cache of the computing device via a network that connects the local cache to the remote global data storage; and processing the second subgraph with the first output values to generate second output values in a subsequent iteration, wherein the DAG represents a sparse matrix of linkage information between web pages, each of the associated input values represents a rank value of a source web page to associated destination web pages, and each output value represents a rank value of the source web page to other source web pages.

10. The computer readable memory of claim 9, wherein the storing the second subgraph into the local cache includes creating a file identifier for the second subgraph.

11. The computer readable memory of claim 10 wherein processing the second subgraph includes using the file identifier as a handle to access the second subgraph.

12. The computer readable memory of claim 9, wherein the storing the second subgraph into the local cache includes storing the subgraph in at least one of a memory cache or a disk cache.

13. The computer readable memory of claim 9, wherein each of the associated input values is an initial input value or an output value from another iteration.

14. A Directed Acyclic Graph (DAG) distributed execution engine, the engine comprising:

a network;

a plurality of computing devices connected by the network, each computing device including:

one or more processors; and memory to store a plurality of computer-executable instructions for execution by the one or more processors, the computer-executable instructions comprising:

storing a plurality of subgraphs of a DAG in a remote global data storage of a distributed storage system;

processing multiple subgraphs of the plurality of subgraphs in multiple computing devices of the DAG distributed execution engine, wherein each of the multiple computing devices produces a vertex based on a corresponding subgraph and corresponding input values;

processing a first subgraph of the plurality of subgraphs from the remote global data storage with associated input values in a computing device in a first iteration by at least producing a vertex using the first subgraph and the associated input values, and aggregating the vertex with vertices produced by the multiple computing devices to generate first output values;

storing a second subgraph that is a copy of the first subgraph in a local cache of the computing device in response to determining that a number of times that the first subgraph has been processed by the computing device exceeds a predetermined threshold; and processing the second subgraph with the first output values to generate second output values in a second iteration that occurs after the first iteration, wherein the DAG represents a sparse matrix of linkage information between web pages, each of the associated input values represents a rank value of a source web page to associated destination web pages, and each output value represents a rank value of the source web page to other source web pages.

15. The engine of claim 14, wherein the processing the second subgraph includes for propagating a vertex using the second subgraph and the first output values.

16. The engine of claim 14, wherein the second iteration occurs consecutively or non-consecutively after the first iteration.

17. The engine of claim 14, wherein each of the associated input values is and initial input value or an output value from another iteration.

* * * * *